United States Patent [19]
Lee et al.

[11] Patent Number: 5,848,057
[45] Date of Patent: Dec. 8, 1998

[54] APPARATUS FOR ESTIMATING VARIABLE BIT RATE (VBR) VIDEO TRAFFIC, AND METHOD THEREFOR

[75] Inventors: Chang-Bum Lee, Daejeon; Kyeong-Bong Ha, Seoul; Rae-Hong Park, Kyunggi-Do, all of Rep. of Korea

[73] Assignees: Electronics and Telecommunications Research Institute, Daejeon; Korea Telecommunication Authority, Seoul, both of Rep. of Korea

[21] Appl. No.: 826,524

[22] Filed: Apr. 3, 1997

[30] Foreign Application Priority Data

Nov. 26, 1996 [KR] Rep. of Korea .................. 1996-57781

[51] Int. Cl.⁶ ...................................... H04J 1/16
[52] U.S. Cl. .......................... 370/232; 370/232; 348/385; 348/387
[58] Field of Search .................................... 370/230, 232, 370/235, 252, 431, 437; 348/385, 387

[56] References Cited

U.S. PATENT DOCUMENTS

| | | | |
|---|---|---|---|
| 5,258,979 | 11/1993 | Oomuro et al. | 370/232 |
| 5,260,783 | 11/1993 | Dixit | 370/395 |
| 5,343,465 | 8/1994 | Khalil | 370/232 |
| 5,515,511 | 5/1996 | Nguyen et al. | 370/431 |
| 5,548,581 | 8/1996 | Makrucki | 370/232 |
| 5,583,792 | 12/1996 | Li et al. | 370/232 |

*Primary Examiner*—Dang Ton
*Assistant Examiner*—Phirin Sam
*Attorney, Agent, or Firm*—Antonelli, Terry, Stout & Kraus, LLP

[57] ABSTRACT

An apparatus is provided for accurately estimating an equivalent bandwidth of a variable bit rate Moving Picture Expert Group in Asynchronous Transfer Mode (ATM) by which an effective connection admission control of VBR MPEG video traffic in ATM network can be performed. The apparatus includes a traffic splitting unit for splitting into the respective frames, a frame traffic calculating unit for performing the approximation for calculating the equivalent bandwidth for the first aggregated frame, a frame traffic combining unit for combining the above two frames, an approximation unit for approximating the resultant moments of the combined frame traffic, a first equivalent bandwidth calculating unit for calculating the equivalent bandwidth of the combined aggregated frame traffic, and a second equivalent bandwidth calculating unit for adding the calculated equivalent bandwidths.

1 Claim, 3 Drawing Sheets

APPARATUS FOR ESTIMATING VARIABLE BIT RATE (VBR) VIDEO TRAFFIC, AND METHOD THEREFOR

BACKGROUND OF THE INVENTION

1. Field of the Invention

The present invention relates to an apparatus for accurately estimating an equivalent bandwidth of a variable bit rate Moving Picture Expert Group in Asynchronous Transfer Mode(ATM), and method therefor.

2. Description of the Conventional Art

FIG. 1 shows a conventional estimator for an equivalent bandwidth of a variable bit rate (VBR) moving picture experts group (MPEG) video traffic.

In the conventional scheme employed for estimating the equivalent bandwidth, the total equivalent bandwidth C is estimated using an upper limit value $m+\alpha\sigma$ obtained from a Gaussian approximation and is computed by:

$$C = m_{\Sigma I} + \alpha_I \sigma_{\Sigma I} + m_{\Sigma B} + \alpha_B \sigma_{\Sigma B} + m_{\Sigma P} + \alpha_P \sigma_{\Sigma P}$$

where $M_{\Sigma FT}$ and $\sigma_{\Sigma FT}$ represent the mean and standard deviation of the aggregated I, B and P frame traffic, respectively, wherein FT implies one of I, B and P frames. Also, $\alpha_{FT}$ represents a constant given by, $$\alpha = \sqrt{2\ln(1/\epsilon) - \ln 2\Pi}$$

where $\epsilon$ denotes the desired buffer overflow probability. The above-mentioned Gaussian approximation is used in preventing an overestimation on the total bandwidth.

It can be seen from the conventional equivalent bandwidth estimating scheme that the total equivalent bandwidth is estimated from the well-known Gaussian approximation through the procedures of splitting MPEG video traffic into the aggregated I, B and P frames and performing the simple addition of the individual equivalent bandwidths.

Therefore the conventional equivalent bandwidth estimating method has a problem in that the total bandwidth is overestimated and an accurate statistical multiplexing gain cannot thus be obtained.

SUMMARY OF THE INVENTION

It is an object of the present invention to provide an apparatus for accurately estimating an equivalent bandwidth of a variable bit rate Moving Picture Expert Group in Asynchronous Transfer Mode(ATM), and method therefor, by which, for effective connection admission control of VBR MPEG video traffic in ATM network, MPEG video traffic is split into I, B and P frame traffic, an equivalent bandwidth is calculated using the method suitable for each of the split frame traffic, respectively, and an equivalent bandwidth of the overall traffic is calculated to estimate the aggregated video traffic. The present invention is superior over the conventional method, since the greatly increased bandwidth according to the present invention allows the applicability of ATM network to be further improved.

To achieve the above objects, there is provided an apparatus that estimates a variable bit rate(VBR) video traffic comprising:

traffic splitting means for receiving VBR moving picture experts group(MPEG) video traffic from the external and splitting it into first, second and third aggregated frames, respectively;

frame traffic calculating means for receiving the first aggregated frame traffic from the traffic splitting means to perform the approximation for calculating the equivalent bandwidth for the first aggregated frame;

frame traffic combining means for receiving both the second and third aggregated frame traffic from the traffic splitting means to combining said two frames;

approximation means for approximating the resultant moments of the combined frame traffic received from the frame traffic combining means;

first equivalent bandwidth calculating means for receiving the parameters output from the approximation means and for calculating the equivalent bandwidth of the combined aggregated frame traffic; and second equivalent bandwidth calculating means for receiving the results from each of the frame traffic calculating means and the first equivalent bandwidth calculating means and adding such results to thereby calculate the equivalent bandwidth of the total aggregated traffic.

According to another aspect of the present invention, there is provided a method for estimating an equivalent bandwidth of variable bit rate(VBR) video traffic, which is applied to an estimating apparatus for estimating VBR video traffic, the method comprising the steps of:

splitting traffic requested to be connected to new call into I, B and P frame traffic, respectively, in case of connection request for the new call;

calculating an equivalent bandwidth for the I frame traffic through the use of the Gaussian approximation method;

combining the B and P frame traffics, performing 2-state approximation for the resultant, and calculating an equivalent bandwidth of the aggregated B/P frame traffic using MEC method;

adding the equivalent bandwidth of the I frame traffic and the aggregated B/P frame traffic to calculate a total equivalent bandwidth, and comparing the total equivalent bandwidth with link capacity; and rejecting the connection request for a new call and advancing to a step of receiving the connection request for a new call, maintaining the moment of the previous aggregated traffic, if the equivalent bandwidth is larger than link capacity after said comparison, and accepting the new call, updating the moment of the aggregated traffic, and then advancing to the step of receiving the connection request to another new call, if the equivalent bandwidth is not larger than the link capacity.

BRIEF DESCRIPTION OF THE DRAWINGS

The present invention will become more fully understood by following the detailed description in conjunction with the accompanying drawings, wherein.

DETAILED DESCRIPTION OF THE INVENTION

The preferred embodiment according to the present invention will now be described in detail in accordance with the accompanying drawings.

Figure 1:
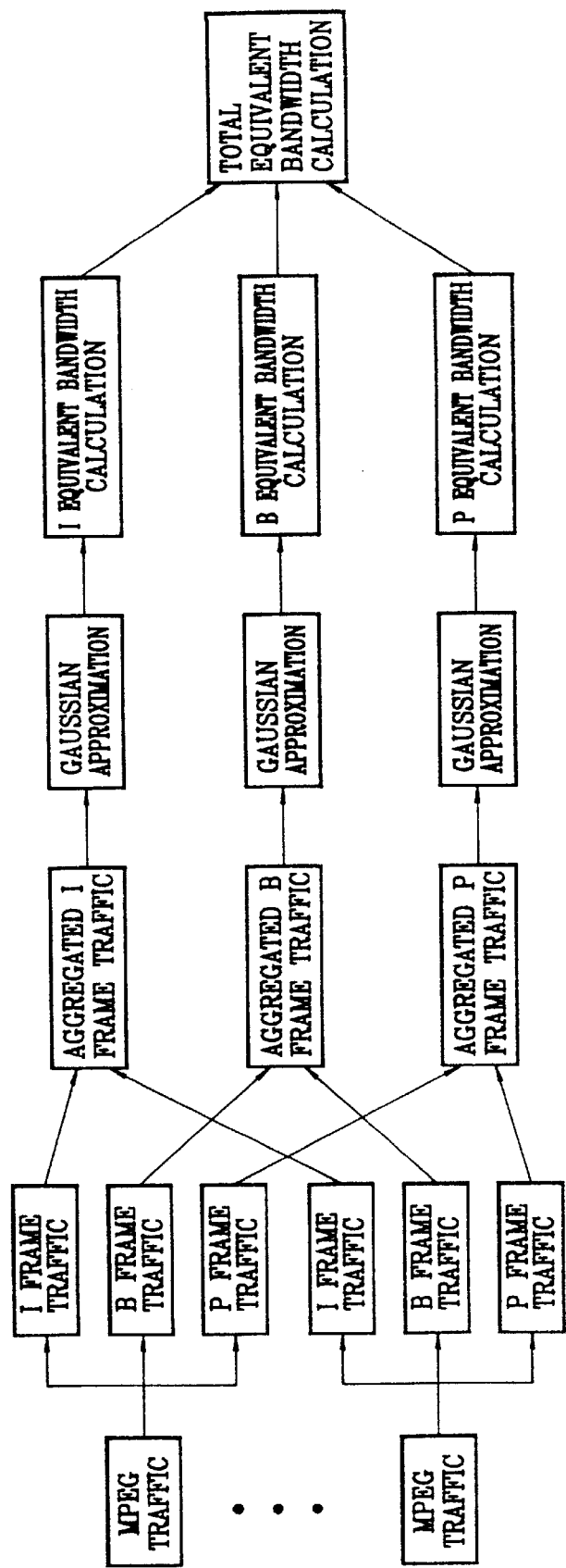
FIG. 1 shows a conventional estimator for estimating an equivalent bandwidth of a variable bit rate (VBR) moving picture experts group (MPEG) video traffic.
Figure 2:
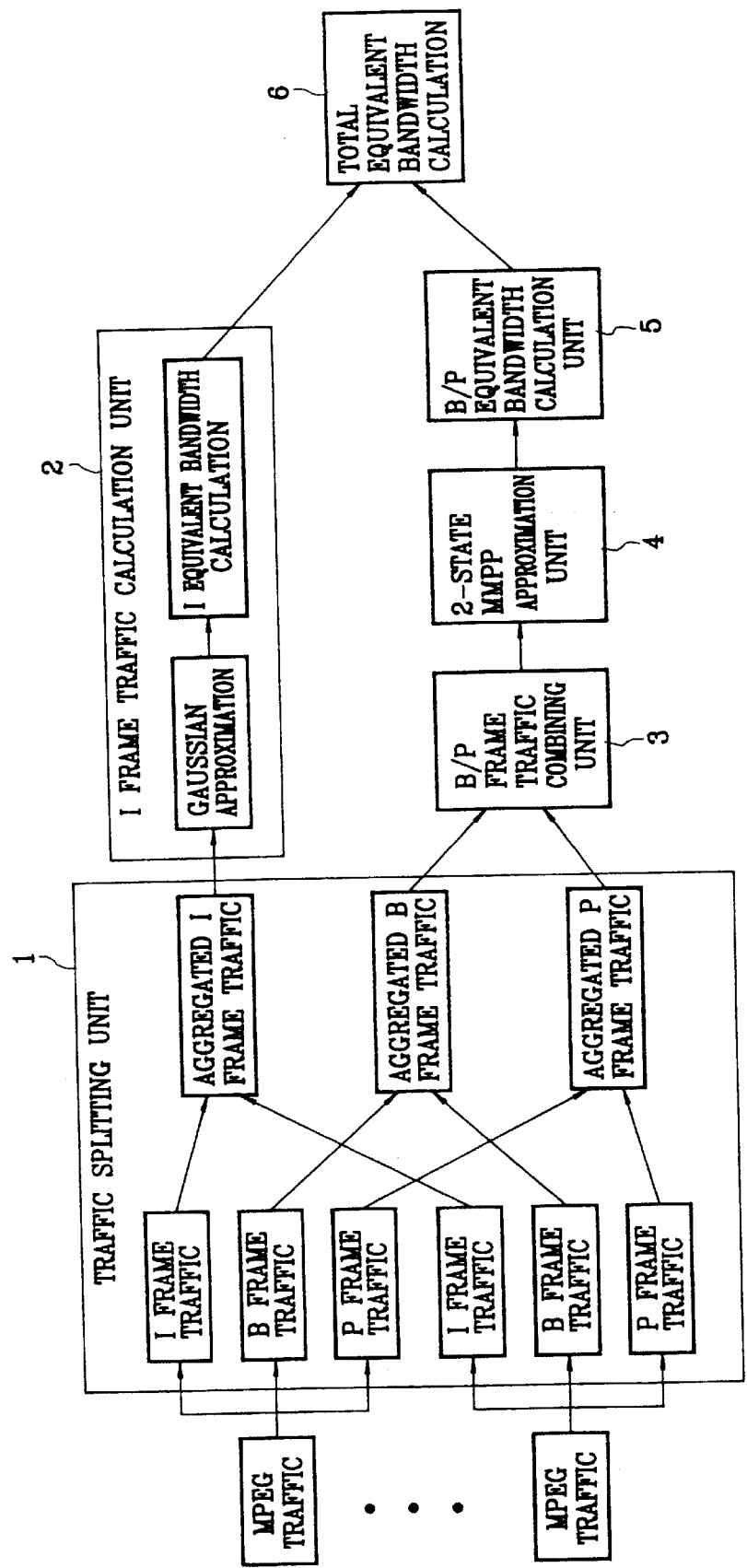
FIG. 2 shows an estimator adapted to estimate an equivalent bandwidth of VBR MPEG video traffic in accordance with the present invention.

FIG. 2 shows an estimator adapted to estimate an equivalent bandwidth of VBR MPEG video traffic in accordance with the present invention. The estimator includes a traffic splitting unit 1, a frame traffic calculating unit 2, a B/P frame traffic combining unit 3, a 2-state MMPP(Markov Modulated Poisson Process) approximation unit 4, a B/P equivalent bandwidth calculating unit 5 and a total equivalent bandwidth calculating unit.

The structure of each unit and the operation thereof will be described.

The traffic splitting unit 1 receives VBR MPEG video traffic from the external and splits it into the aggregated I, B, and P frames, respectively.

The I frame traffic calculating unit 2 receives the aggregated I frame traffic from the traffic splitting unit 1 to perform the Gaussian approximation for computing the effective bandwidth for the aggregated I frame traffic.

The B/P frame traffic combining unit 3 receives both the aggregated B frame traffic and P frame traffic from the traffic splitting unit 1 to combine those two frames.

At this time, statistical characteristics of the combined B and P frame traffics are computed by:

$$m_{\Sigma(B+P)} = m_{\Sigma B} + m_{\Sigma P}$$

$$\mu_{2,\Sigma(B+P)} = \mu_{2,\Sigma B} + \mu_{2,\Sigma P}$$

$$\mu_{3,\Sigma(B+P)} = \mu_{3,\Sigma B} + \mu_{3,\Sigma P}$$

and $$R_{93\ (B+P)}(1) = (\mu_{2,\Sigma B} R_{\Sigma B}(1) + \mu_{2,\Sigma P} R_{\Sigma P}(1))/\mu_{\Sigma(B+P)}$$

where the subscript $\Sigma B$ and $\Sigma P$ represent the aggregated B frame traffic and aggregated P frame traffic, respectively. Similarly, the subscript $\Sigma(B+P)$ denotes the combined (B+P) frame traffic.

The 2-state MMPP approximation unit 4 approximates the resultant moments of the combined (B+P) frame traffic received from the B/P frame traffic combining unit 3 to 2-state MMPP parameters widely used in modeling the aggregated traffic.

For computation of such 2-state MMPP parameters, statistical characteristics of the aggregated traffic are obtained through the procedures described below.

First, the starting position of the I frames is set asynchronously, and the mean $m_{\Sigma FT}$ and the second and third central moments $\mu_{2,\Sigma FT}, \mu_{3,\Sigma FT}$ of the aggregated traffic are computed by:

$$m_{\Sigma FT} = \frac{N_{FT}}{N_{GOP}} \sum_{i=1}^{N} m_i^{FT},$$

$$\mu_{2,\Sigma FT} = \frac{N_{FT}}{N_{GOP}} \sum_{i=1}^{N} \mu_{2,i}^{FT},$$

and $$\mu_{3,\Sigma FT} = \frac{N_{FT}}{N_{GOP}} \sum_{i=1}^{N} \mu_{3,i}^{FT}$$

where FT represents one of I, B and P frames, and N represents the number of frames in GOP(Group Of Picture) of FT type frame. The subscript $\Sigma FT$ denotes the aggregated traffic of FT type frame. $N_{GOP}$ denotes the number of frames in a single GOP.

The 2-state parameters, $\lambda_{high}, \lambda_{low}, \gamma_{high},$ and $\gamma_{low}$ are, based upon the mean m, variance v and third moment $\mu_3$, given by:

$$\gamma_{high} = \frac{1}{\tau_c(1+\eta)},$$

$$\gamma_{low} = \frac{\eta}{\tau_c(1+\eta)},$$

$$\gamma_{high} = m + \sqrt{v/\eta},$$

and $$\lambda_{low} = m - \sqrt{v\eta}$$

where $\gamma_{high}$ and $\gamma_{low}$ represent the transition rates out of the high state and low state, $\lambda_{high}$ and $\lambda_{low}$ represent corresponding arrival rates for the high state and low state, and $$\eta = 1 + \frac{\delta}{2}\left(\delta - \sqrt{4+\delta^2}\right)$$

$$\delta = \frac{m_3 - 3mv - m^3}{v^{3/2}}$$

in which v denotes the variance of bit rate of the aggregated traffic, and $\tau_c$ denotes the time constant.

The B/P equivalent bandwidth calculating unit 5 receives the parameters output from the 2-state MMPP approximation unit 4 and calculates the equivalent bandwidth of B/P frame by using MEC(Modified Equivalent Capacity) method.

MEC $C_m$ is defined as:

$$C_m = (\lambda_{high} - \lambda_{low})\frac{y - X + \sqrt{(y-X)^2 + 4X\rho y}}{2y} + \lambda_{low}$$

where X denotes the buffer size, and the constants y and $\rho$ are given as:

$$y = ln(I/\epsilon)(1-\rho)(\lambda_{high} - \lambda_{low})/\lambda_{high},$$

and $$\rho = \gamma_{low}/(\gamma_{high} + \gamma_{low}),$$

respectively.

The total equivalent calculating unit 6 receives the results from each of the I frame traffic calculating unit 2 and the B/P equivalent bandwidth calculating unit 5 and adds those results to calculate the equivalent bandwidth of the total aggregated traffic.

The total equivalent bandwidth C of the aggregated MPEG traffic is as follows:

$$C = c_{\Sigma(B+P)} + m_{\Sigma I} + \alpha\sigma_{\Sigma I}$$

where $C_{\Sigma(B+P)}$ represents MEC of the aggregated (B+P) frame traffic. Also, $m_{\Sigma I}$ and $\Sigma_{\Sigma I}$ denote the mean and standard deviation of the aggregated I frame traffic, respectively.

Figure 3:
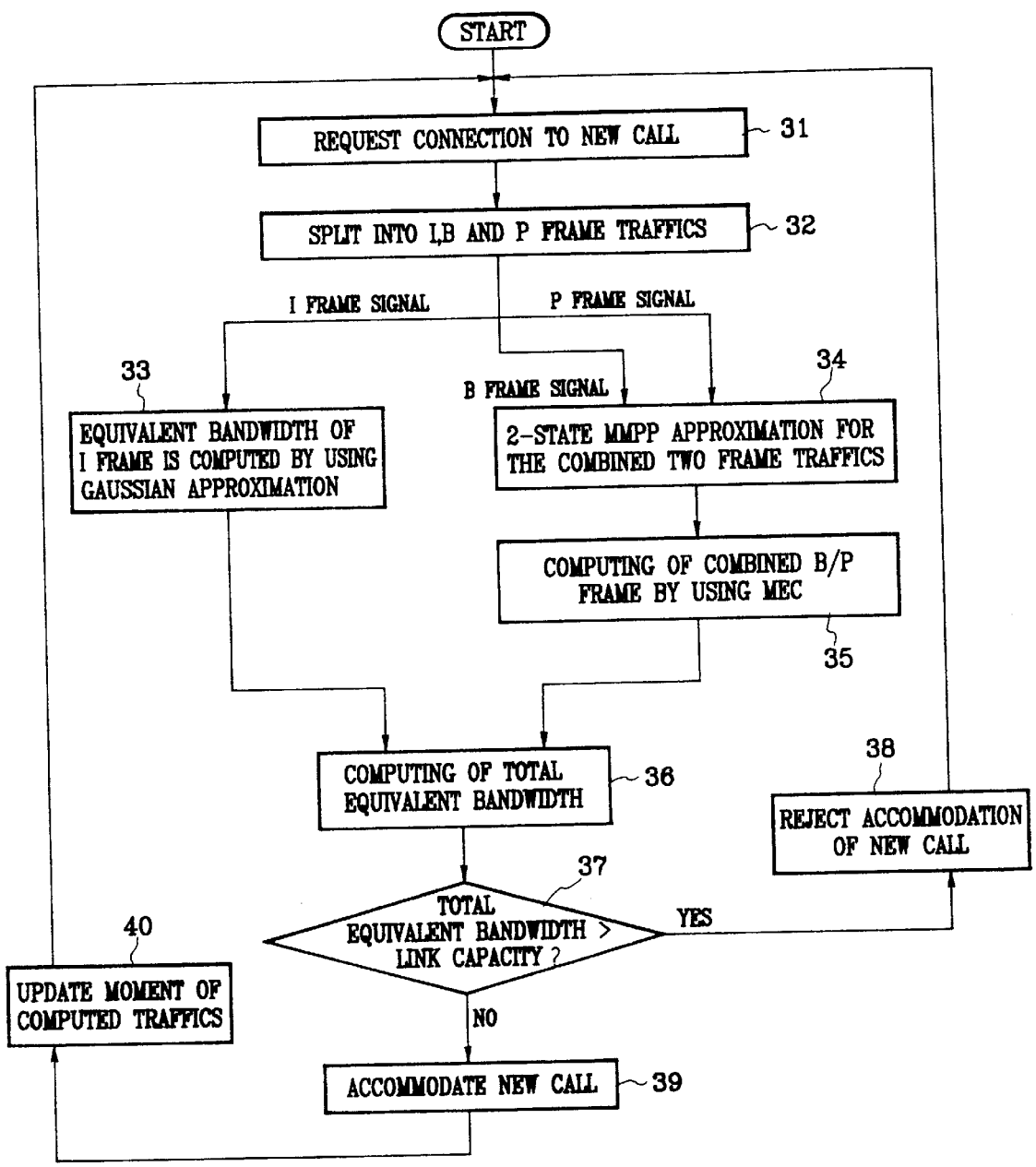
FIG. 3 shows a flowchart illustrating a process for estimating an equivalent bandwidth of the VBR MPEG video traffic.

FIG. 3 is a flowchart illustrating a process for estimating an equivalent bandwidth of the VBR MPEG video traffic.

The process waits for the connection request for a new call, for controlling a connection admission. Upon receiving the request for connection for the new call(31), the traffic requested to be connected is split into I, B and P frame traffics(32). Then, the Gaussian approximation method is applied to I frame traffic for calculating an equivalent bandwidth(33), while the 2-state MMPP approximation applied to the combined B and P frame traffic(34). MEC method is used to calculate the equivalent bandwidth of the aggregated B/P frame traffic(35).

Next, the computation of the total equivalent is made by adding the equivalent bandwidth of I frame traffic and the equivalent bandwidth of the aggregated B/P frame traffic (36). The calculated total equivalent bandwidth is compared with the link capacity(37). If the equivalent bandwidth is larger than the link capacity, the connection request for the new call is rejected and the process goes to the procedure (31) which receives the connection request to new call, maintaining the moment of the previous aggregated traffic (38).

However, if the equivalent bandwidth is not larger than the link capacity, the new call is accepted(39), and the moment of the aggregated traffic is updated(40). Then, the process goes to the procedure(31) which receives the connection request to a new call.

The present invention provides an accurate estimate method for the required equivalent bandwidth, further improved over the conventional estimate method that estimates the total equivalent bandwidth through a simple addition of bandwidths of individual I, B and P frame traffics.

Also, the accurate estimate on the bandwidth that the aggregated traffic requires allows more calls to be accepted in case of the connection admission control, which results in more effective usage than in the communication link and increases in applicability.

Furthermore, the estimate on the necessary bandwidth can be made through smaller operations of the products and additions, by which the real time connection admission control is possible.

The foregoing description and drawings are illustrative and are not to be taken as limiting. Still other variations and modifications are possible without departing from the spirit and scope of the present invention.

What is claimed is:

1. A method for estimating an equivalent bandwidth of variable bit rate (VBR) video traffic, which is applied to an estimating apparatus for estimating VBR video traffic, said method comprising the steps of:

splitting traffic which is requested to be connected to a new call into I, B and P frame traffic, respectively, in case of the connection request to the new call;

calculating an equivalent bandwidth for the I frame traffic through the use of the Gaussian approximation method;

combining the B and P frame traffic, performing 2-state approximation for the resultant, and calculating an equivalent bandwidth of the aggregated B/P frame traffic using the modified equipment capacity (MEC) method;

adding the equivalent bandwidth of the I frame traffic and aggregated B/P frame traffic to calculate a total equivalent bandwidth, and comparing the total equivalent bandwidth with a link capacity; and rejecting the connection request to the new call and advancing to the step of accepting the connection request to the new call, maintaining the moment of the previous aggregated traffic, if the equivalent bandwidth of the I frame traffic is larger than link capacity after a comparison, and accommodating the new call, updating the moment of the aggregated B/P frame traffic, and then advancing to the step of receiving the connection request to another new call, if the total equivalent bandwidth is not larger than the link capacity.

* * * * *